US009398554B2

(12) United States Patent
Yeh et al.

(10) Patent No.: US 9,398,554 B2
(45) Date of Patent: Jul. 19, 2016

(54) METHOD FOR NETWORK SYNCHRONIZATION ACQUISITION IN WIRELESS NETWORKS

(71) Applicant: Electronics & Telecommunications Research Institute, Daejeon (KR)

(72) Inventors: Choong Il Yeh, Daejeon (KR); Jae Young Ahn, Daejeon (KR); Tae Gyun Noh, Daejeon (KR)

(73) Assignee: Electronics & Telecommunications Research Institute, Daejeon (KR)

( * ) Notice: Subject to any disclaimer, the term of this patent is extended or adjusted under 35 U.S.C. 154(b) by 14 days.

(21) Appl. No.: 14/291,292

(22) Filed: May 30, 2014

(65) Prior Publication Data
US 2014/0355597 A1    Dec. 4, 2014

(30) Foreign Application Priority Data

May 31, 2013  (KR) .................. 10-2013-0062295
Jul. 8, 2013   (KR) .................. 10-2013-0079707
Sep. 9, 2013   (KR) .................. 10-2013-0107989
May 29, 2014  (KR) .................. 10-2014-0065045

(51) Int. Cl.
*H04W 56/00* (2009.01)
*H04L 27/26* (2006.01)
*H04L 5/00* (2006.01)

(52) U.S. Cl.
CPC ....... *H04W 56/0045* (2013.01); *H04L 27/2662* (2013.01); *H04L 27/2692* (2013.01); *H04L 5/0053* (2013.01)

(58) Field of Classification Search
CPC .... H04J 11/0069; H04B 1/713; H04W 48/16; H04W 56/001; H04W 48/12; H04W 88/085; H04W 84/045; H04L 5/0053; H04L 27/2656; H04L 5/0048; H04L 5/0064; H04L 5/0023; H04L 5/0016; H04L 5/001
See application file for complete search history.

(56) References Cited

U.S. PATENT DOCUMENTS

| 2008/0095108 | A1* | 4/2008 | Malladi | H04B 1/713 370/329 |
| 2010/0118837 | A1 | 5/2010 | Bracha | |
| 2011/0319012 | A1* | 12/2011 | Park | H04B 7/155 455/7 |
| 2013/0322276 | A1* | 12/2013 | Pelletier | H04W 72/085 370/252 |

OTHER PUBLICATIONS

Manolakis, K., Gutierrez Estevez, D. M., Jungnickel, V., Xu, W., & Drewes, C. "A Closed Concept for Synchronization and Cell Search in 3GPP LTE Systems" In *Wireless Commununications and Networking Conference*, (Apr. 2009) *IEEE*(pp. 1-6).

* cited by examiner

*Primary Examiner* — Jung-Jen Liu
(74) *Attorney, Agent, or Firm* — NSIP Law

(57) ABSTRACT

Disclosed is a method for network synchronization acquisition in a wireless network. A synchronized node transmits a first synchronization reference signal, a second synchronization reference signal, and a beacon according to a predetermined period. A non-synchronized node receives the first synchronization reference signal, the second synchronization signal, and the beacon from at least one transmitting node. Then, the non-synchronized node acquires network synchronization temporarily based on the first synchronization reference signal, decodes the beacon, and checks whether at least one transmitting node exists or not. Then, the non-synchronized node requests a network synchronization forwarding service or a time adjustment, and acquires synchronization based on the provided network synchronization forwarding service.

17 Claims, 8 Drawing Sheets

METHOD FOR NETWORK SYNCHRONIZATION ACQUISITION IN WIRELESS NETWORKS

CLAIM FOR PRIORITY

This application claims priorities to Korean Patent Application Nos. 10-2013-0062295 filed on May 31, 2013, 10-2013-0079707 filed on Jul. 8, 2013, 10-2013-0107989 filed on Sep. 9, 2013, and 10-2014-0065045 filed on May 29, 2014 in the Korean Intellectual Property Office (KIPO), the entire contents of which are hereby incorporated by references.

BACKGROUND

1. Technical Field

Example embodiments of the present invention relate to a wireless communication technology, and more specifically, a method for individual nodes which are components of a wireless network requiring network synchronization to acquire network synchronization.

2. Related Art

A type of synchronization used in a wireless network may be classified into a packet synchronization (or, a link-level synchronization) and a network synchronization.

In a case of the packet synchronization, a receiver should know a start position of a packet and a modulation symbol timing of the packet in order to perform demodulation on the packet. A transmitter may transmit a training sequence or a preamble (PR) as included in a former part of the packet in order to notify the receiver the start position of the packet and make the receiver be able to perform demodulation by symbol timing recovery. In this case, the transmitter may transmit the packet at any time when it is necessary, and definitions on a packet transmission start time or packet transmission length are not necessary.

On the contrary, the network synchronization is a type of synchronization in which a start position and a length of a frame or a slot should be predefined. The start position and length of a frame and a slot, which can be recognized by all nodes in a wireless network, are configured identically. The transmitter should use a specific frame or a specific slot to transmit a packet.

On the other hand, a wireless network may be controlled in a centralized manner or in a decentralized manner. In a case of the centralized manner, a concentration node (for example, a base station) may be responsible for transmission, resource allocation, and control of synchronization signals required for network synchronization. However, in a case of the decentralized manner, since the concentration node does not exist, the above functions may be performed autonomously or automatically by individual nodes.

A Carrier Sense Multiple Access/Collision Avoidance (CSMA/CD) of IEEE 802.11 is a well-known algorithm supporting the above mentioned decentralized control manner. It is based on an Orthogonal Frequency Division Multiplexing (OFDM), and requires a link-level synchronization. However, it does not require a network synchronization. Therefore, the decentralized control manner used in the IEEE 802.11 may be strictly represented as 'an asynchronous CSMA/CA based on OFDM'.

It is well-known that enhancement of system throughput and effect of decreasing power consumption may be achieved in an environment to which network synchronization is applied. Also, it is well-known that an Orthogonal Frequency Division Multiple Access (OFDMA) makes flexible and efficient use of frequency resources possible as compared to the OFDM. Although the system based on the OFDM may select at least one of link-level synchronization and network synchronization, the system based on the OFDMA should adopt network synchronization.

As described above, the network synchronization provides advantages which cannot be given up on many aspects for both the OFDM system and the OFDMA system.

However, a detail method for each node in an environment based on decentralized control manner to acquire network synchronization has not been proposed until now.

SUMMARY

Accordingly, example embodiments of the present invention are provided to substantially obviate one or more problems due to limitations and disadvantages of the related art.

Example embodiments of the present invention provide methods for individual nodes in a decentralized control based wireless network environment to acquire network synchronization efficiently.

In an example embodiment, there is provided a method for network synchronization acquisition, performed in a node, the method comprising generating a synchronization signal including a synchronization reference signal and a beacon according to a configured first period; and transmitting the synchronization signal.

Also, in the generating a synchronization signal, the synchronization signal may be generated in unit of a frame or N (N is a natural number equal to or more than 2) frames comprising a plurality of slots, and the synchronization signal and the beacon may be included in a slot selected by the node among the plurality of slots, or may be included in a frame selected by the node among the N frames.

Also, the synchronization signal may include a first synchronization reference signal and a second synchronization reference signal, and the first synchronization signal may comprise a signal common to all nodes in order for a non-synchronized node to acquire a temporary synchronization, and the second synchronization reference signal may comprise a sequence determined according to a position of the beacon selected by the node and information included in the beacon.

Here, the second synchronization reference signal may be configured with a Zadoff-Chu sequence, and all nodes may use same length and root index of the Zadoff-Chu sequence, and different cyclic shifts may be applied to the Zadoff-Chu sequence according to a position of the beacon selected by the node and information included in the beacon.

Also, the beacon may be configured as multiple beacons, and the multiple beacons and the second synchronization reference signal may be multiplexed in a time-frequency region allocated for synchronization management.

Also, the beacon may include at least one of a request of network synchronization forwarding service or time adjustment (TA), a request for stopping network synchronization forwarding service, a notification of a state of network synchronization forwarding service, and information used for a node transmitting the beacon to advertise itself.

Also, the method may further comprise, when a beacon including information indicating a request of time adjustment is received from other node after the transmitting the synchronization signal, measuring a propagation delay between the node and the other node based on a second synchronization reference signal transmitted from the other node, and transmitting a beacon including information about the measured propagation delay to the other node.

Also, the method may further comprise, when a request of network synchronization forwarding service is received from other node after the transmitting the synchronization signal, transmitting the synchronization signal and the beacon to the other node according to a second period shorter than the first period.

In another example embodiment, there is provided a method for network synchronization acquisition, performed in a receiving node, the method comprising receiving at least one first synchronization reference signal, at least one second synchronization reference signal, and at least one beacon which are transmitted from at least one transmitting node; acquiring network synchronization temporarily based on the at least one first synchronization reference signal, and checking whether the at least one transmitting node exists or not by decoding the at least one beacon; and requesting a network synchronization forwarding service or a time adjustment (TA) to a specific transmitting node whose existence is checked.

Also, in the checking whether the at least one transmitting node exists or not, when a plurality of transmitting nodes transmit at least one first synchronization reference signal, the at least one first synchronization reference signal transmitted from the plurality of transmitting nodes may be separated by using the at least one second synchronization reference signal.

Also, in the requesting a network synchronization forwarding service or a time adjustment, a beacon including information for requesting the network synchronization forwarding service or the time adjustment and a second synchronization reference signal may be transmitted to the specific transmitting node.

Here, in the requesting a network synchronization forwarding service or a time adjustment, a transmission reference timing may be configured by referring to a reception timing of the first synchronization reference signal, and the beacon including information for requesting the network synchronization forwarding service or the time adjustment and the second synchronization reference signal may be transmitted according to the configured transmission reference timing.

Here, when a plurality of first synchronization reference signals are received respectively from a plurality of transmitting nodes, the transmission reference timing may be configured with a reception timing of a first synchronization reference signal received firstly among the plurality of first synchronization reference signals Also, the requesting a network synchronization forwarding service or a time adjustment may comprise, when the receiving node receives synchronization signals from a first transmitting node and a second transmitting node simultaneously, obtaining a first propagation delay between the first transmitting node and the receiving node, a second propagation delay between the second transmitting node and the receiving node, and a difference between the first propagation delay and the second propagation delay; and compensating a propagation delay based on the difference, and transmitting the beacon including information for requesting the network synchronization forwarding service or the time adjustment and the second synchronization reference signal.

Also, the method may further comprise, after the requesting a network synchronization forwarding service or a time adjustment, acquiring network synchronization based on the network synchronization forwarding service provided by the specific transmitting node; and requesting a stop of the network synchronization forwarding service to the specific transmitting node.

Also, in the requesting a network synchronization forwarding service or a time adjustment, when a plurality of transmitting nodes respectively transmit the first synchronization reference signal, the second synchronization reference signal, and the beacon, the network synchronization forwarding service or the time adjustment may be requested to a transmitting node having an absolute time reference or a transmitting node having more nodes being provided network synchronization forwarding service from the receiving node than other transmitting nodes.

Also, in the requesting a network synchronization forwarding service or a time adjustment, when a plurality of transmitting nodes respectively transmit the first synchronization reference signal, the second synchronization reference signal, and the beacon according to different time references, the specific transmitting node may be determined according to network connectivity or power capability.

In other example embodiment, there is provided a method for network synchronization acquisition, performed in a node, the method comprising: configuring time-frequency resources given for network synchronization acquisition as repetitive frames which are classified into a region for data transmission and a region for synchronization; and transmitting a synchronization reference signal and a beacon channel through which information needed for synchronization management is transmitted by using the region for synchronization.

In still other example embodiment, there is provided a method for network synchronization acquisition, performed in a node, the method comprising: receiving a first synchronization reference signal from a synchronization header; and performing at least one function of an automatic gain control (AGC), a frame timing acquisition, and an automatic frequency control (AFC) by using the first synchronization reference signal.

Here, the method may further comprise obtaining a synchronization reference of the synchronization header by performing at least one function of an automatic gain control (AGC), a frame timing acquisition, and an automatic frequency control (AFC) by using the first synchronization reference signal.

In still other example embodiment, there is provided a method for network synchronization acquisition, performed in a synchronization forwarding node forwarding network synchronization, the method comprising: receiving a synchronization reference signal and a beacon; obtaining network synchronization based on the synchronization reference signal and the beacon; and transmitting the obtained network synchronization to other terminal, wherein the obtained network synchronization is transmitted through a frame other than a frame through which the synchronization reference signal and the beacon are received, and transmitted at a time different from a time when the synchronization reference signal and the beacon are received.

In still other example embodiment, there is provided a method for network synchronization acquisition, performed in a node, the method comprising: at an initial state that network synchronization is not acquired, determining whether the network synchronization exists or not based on synchronization reference signal and a beacon transmitted periodically; and when the network synchronization does not exist, acting as a synchronization header by transmitting a synchronization reference signal and a beacon periodically.

In still other example embodiment, there is provided a method for network synchronization acquisition, performed in a node, the method comprising: receiving synchronization reference signals and beacons from at least two synchronization headers; separating the at least two synchronization headers into a first synchronization header having a low priority and a second synchronization header having a high priority based on the received synchronization reference signals and beacons; requesting the first synchronization header to stop transmitting a synchronization reference signal and a beacon; obtaining network synchronization based on the synchronization reference signal and the beacon received from the second synchronization header; and forwarding the obtained network synchronization to the first synchronization header.

BRIEF DESCRIPTION OF DRAWINGS

Example embodiments of the present invention will become more apparent by describing in detail example embodiments of the present invention with reference to the accompanying drawings, in which.

DESCRIPTION OF EXAMPLE EMBODIMENTS

Figure 1:
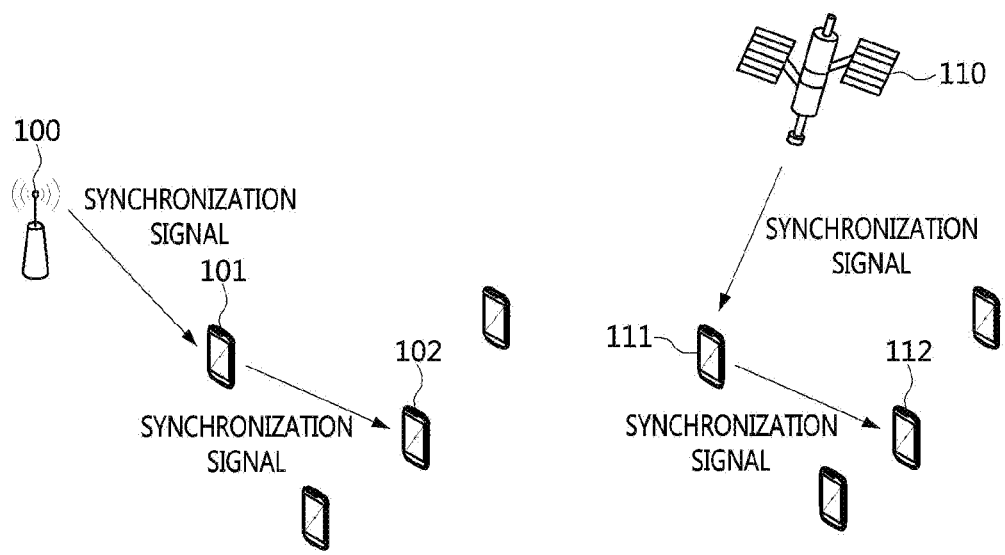
FIG. 1 is a view illustrating an example of a method for a node which does not acquire network synchronization in a wireless network to acquire network synchronization.

Example embodiments of the present invention are disclosed herein. However, specific structural and functional details disclosed herein are merely representative for purposes of describing example embodiments of the present invention, however, example embodiments of the present invention may be embodied in many alternate forms and should not be construed as limited to example embodiments of the present invention set forth herein.

Accordingly, while the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention. Like numbers refer to like elements throughout the description of the figures.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Example embodiments of the present invention, which will be explained in the following descriptions, may be based on standard specifications of at least one of an Institute of Electrical and Electronics Engineers (IEEE) 802 system, a $3^{rd}$ Generation Partnership Project (3GPP) system, and a 3GPP2 system. That is, steps or portions constituting the example embodiments of the present invention, which are not explained in the following description to make the technical spirit of the present invention clear, may be supported by the above specifications. Also, all terminologies used in the present invention may be explained based on the above specifications.

A "terminal" used in this disclosure may refer to user equipment (UE), a mobile station (MS), a user terminal (UT), a wireless terminal, an access terminal (AT), a terminal, a subscriber unit, a subscriber station (SS), a wireless device, a wireless communication device, a wireless transmit/receive unit (WTRU), a mobile node, a mobile, etc. Various examples of the terminal may include a cellular phone, a smartphone having a wireless communication function, a personal digital assistant (PDA) having a wireless communication function, a wireless modem, a portable computer having a wireless communication function, a photographing device such as a digital cameras having a wireless communication function, a gaming device having a wireless communication function, a music storage and reproduction home appliance have a wireless communication function, an Internet home appliance capable of wireless Internet access and browsing, and a portable unit or a terminal having a combination of such functions.

A "cell" or a "base station" used in this disclosure generally refers to a fixed or mobile point that communicates with a terminal and may be a term for collectively referring to a base station, node-B, eNode-B, a BTS (base transceiver system), an access point, a transmit point, a receive point, an RRH (Remote Radio Head), an RRE (Remote Radio Element), an RRU (Remote Radio Unit), a relay, a femto-cell, etc.

A wireless network comprises a plurality of nodes. Among the plurality of nodes, some nodes (synchronized nodes) which acquire network synchronization may exist, and other nodes (non-synchronized nodes) which do not acquire network synchronization may exist. Or, all nodes in the wireless network may be in a non-network synchronized state. Hereinafter, methods for a node which does not acquire network synchronization in a wireless network to acquire network synchronization will be described.

FIG. 1 is a view illustrating an example of a method for a node which does not acquire network synchronization in a wireless network to acquire network synchronization. In FIG. 1, an example, in which the node which does not acquire network synchronization acquires network synchronization by using synchronization signals transmitted from an infra base station 100 or other node 110 connected to a Global Positioning System (GPS), is illustrated.

Referring to FIG. 1, a node 101 is connected to an infra base station 100, and acquires network synchronization based on a synchronization signal transmitted from the infra base station 100. A node 102 acquires network synchronization based on a synchronization signal transmitted from the node 101 which acquired network synchronization.

Meanwhile, a node 111 acquires network synchronization by using a signal transmitted from a GPS satellite 110, and a node 112 acquires network synchronization by using a synchronization signal transmitted from the node 111 which acquired network synchronization.

Figure 2:
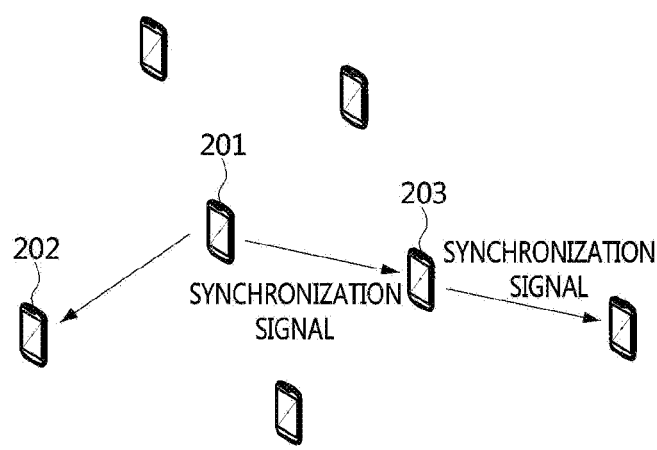
FIG. 2 is a view illustrating another example of a method for a node which does not acquire network synchronization in a wireless network to acquire network synchronization.

FIG. 2 is a view illustrating another example of a method for a node which does not acquire network synchronization in a wireless network to acquire network synchronization. In FIG. 2, an example, in which a node which does not acquire network synchronization acquires network synchronization by using a synchronization signal transmitted from an arbitrary node in a wireless network, is illustrated.

Referring to FIG. 2, when any node among a plurality of nodes in a wireless network is not connected to an infra base station or a GPS, an arbitrary node may transmit a synchronization signal without referring to any absolute time references.

For example, as shown in FIG. 2, when any nodes constituting a wireless network do not acquire network synchronization, an arbitrary node 201 may transmit a synchronization signal for network synchronization. A node 202 and a node 203 may acquire network synchronization based on the synchronization signal transmitted from the arbitrary node 201.

Figure 3:
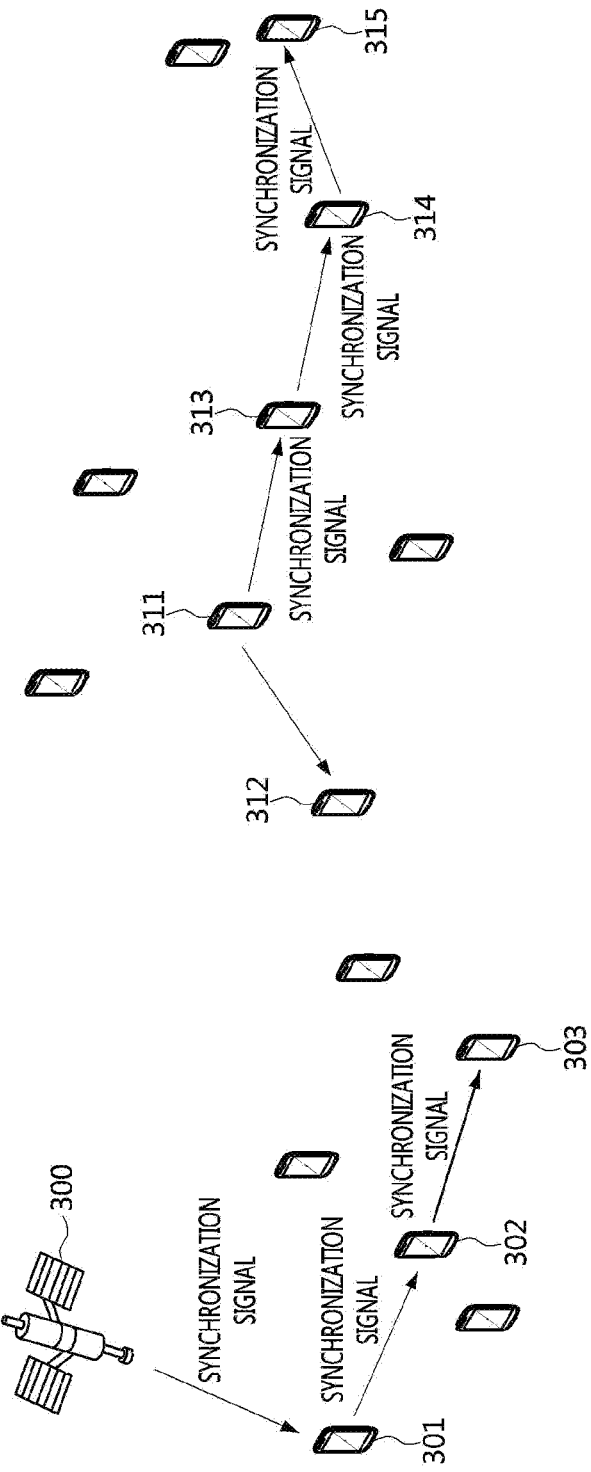
FIG. 3 is a view illustrating other example of a method for a node which does not acquire network synchronization in a wireless network to acquire network synchronization.

FIG. 3 is a view illustrating other example of a method for a node which does not acquire network synchronization in a wireless network to acquire network synchronization. In FIG. 3, a method for network synchronization acquisition by using multi-hop synchronization signal forwarding is illustrated.

Referring to FIG. 3, a node 301 acquires network synchronization based on a signal transmitted from a GPS satellite 300, and transmits a synchronization signal to a node 302. Also, the node 302 may transmit a synchronization signal to a node 303 so that the node 303 may acquire network synchronization based on the synchronization signal transmitted from the node 302 in a multi-hop manner.

Alternatively, when any nodes in a wireless network do not acquire network synchronization, an arbitrary node 311 transmits a synchronization signal for network synchronization to a node 312 and a node 313, and the node 313 transmits a synchronization signal to a node 314. Also, the node 314 may transmit a synchronization signal to a node 315, and the node 315 may acquire network synchronization based on the synchronization signal forwarded in the multi-hop manner.

Among the above-described network synchronization acquisition methods, the method illustrated in FIG. 1 is a network synchronization acquisition method based on an absolute time reference. However, the method illustrated in FIG. 2 is not a method based on an absolute time reference. In case of methods based on an absolute time reference, even when a plurality of nodes transmit synchronization signals, propagation delays are compensated so that timing offsets between the nodes transmitting synchronization signals do not exist. However, in case of methods which are not based on an absolute time reference, when a plurality of node transmit synchronization signals, timing offsets between the nodes transmitting synchronization signals may not be negligible. Here, the timing offset means differences between start times of difference frames or slots. Therefore, in the case of methods which are not based on an absolute time reference, multiple reference times for network synchronization may exist.

In a wireless network in which network synchronization is assumed, each node transmits a packet at a coincident start time defined for frames and slots. Therefore, a procedure for compensating propagation delays and means for resolving timing offsets occurring when synchronization signals are transmitted from a plurality of nodes without referring to an absolute time reference are necessary.

A network synchronization forwarding service may be provided under the following three scenarios.

In the following descriptions, a non-synchronized node may mean a node which does not acquire network synchronization (or, reference time), and a synchronized node may mean a node which acquires network synchronization (or, reference time).

Figure 4:
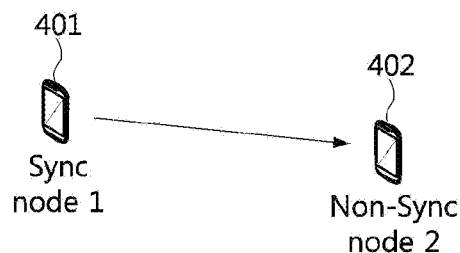
FIG. 4 is a view illustrating a scenario in which a non-synchronized node receives a synchronization reference signal from a single synchronized node.
Figure 5:
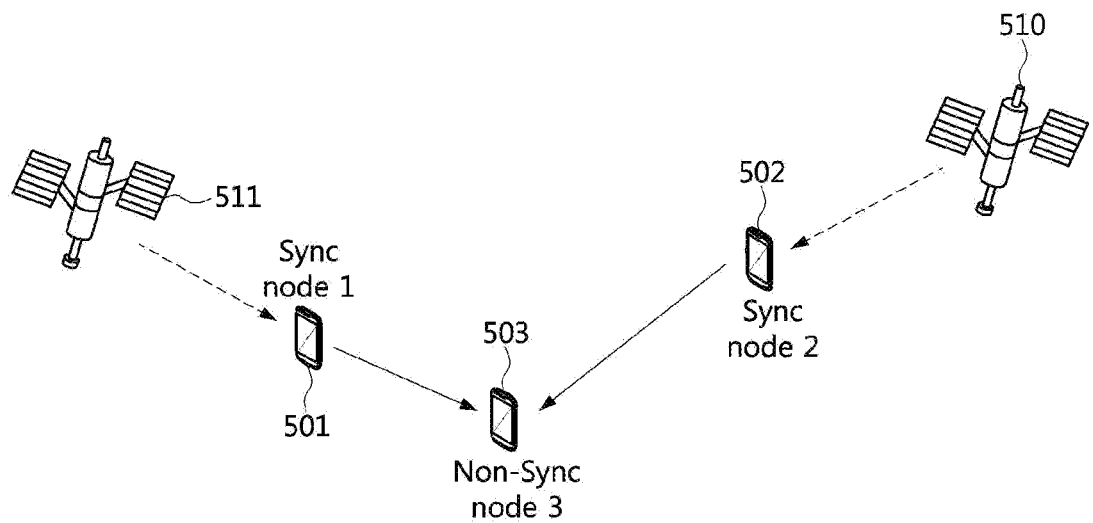
FIG. 5 is a view illustrating a scenario in which a non-synchronized node receives absolute synchronization reference signals from a plurality of synchronized nodes.
Figure 6:
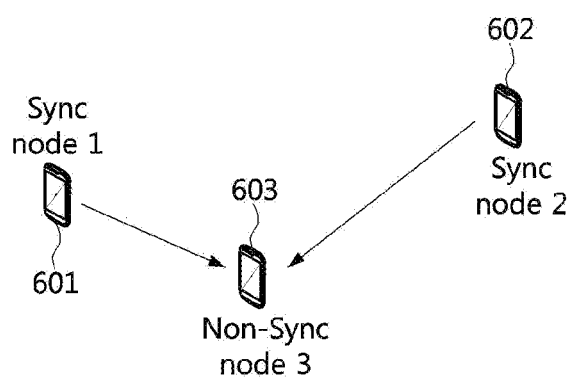
FIG. 6 is a view illustrating a scenario in which a non-synchronized node receives non-absolute synchronization reference signals from a plurality of synchronized nodes.

FIGS. 4 to 6 are views illustrating scenarios in which a non-synchronized node receives a synchronization reference signal from at least one synchronized node.

FIG. 4 is a view illustrating a scenario in which a non-synchronized node receives a synchronization reference signal from a single synchronized node. In FIG. 4, an example in which a non-synchronized node 402 receives a synchronization reference signal from a synchronized node 401 is illustrated. In this case, the non-synchronized node 402 may compensate a propagation delay between the synchronized node 401 and itself, and then transmit a signal or a channel.

FIG. 5 is a view illustrating a scenario in which a non-synchronized node receives absolute synchronization reference signals from a plurality of synchronized nodes. In FIG. 5, an example in which a non-synchronized node 503 receives synchronization signals based on absolute reference time from a synchronized node 501 and a synchronized node 502 is illustrated. Here, the synchronized node 501 and the synchronized node 502 may acquire synchronization based on signals received from a GPS satellite 511 and from a GPS satellite 510 respectively, or they may acquire synchronization by connecting to an infra base station. In the scenario illustrated in FIG. 5, the non-synchronized node 503 should compensate propagation delays between itself and the synchronized nodes 501 and 502 in order to transmit a signal or a channel. Therefore, the non-synchronized node 503 is required to separate the synchronized node 501 and the synchronized node 502.

FIG. 6 is a view illustrating a scenario in which a non-synchronized node receives non-absolute synchronization reference signals from a plurality of synchronized nodes. In FIG. 6, an example in which a non-synchronized node 603 receives non-absolute synchronization reference signals from a synchronized node 601 and a synchronized node 602 is illustrated. In this case, one of the synchronized node 601 and the synchronized node 602 should stop transmitting its synchronization signal and acquire network synchronization again by using a synchronization signal transmitted from the non-synchronized node 603. If the non-synchronized node 603 acquires network synchronization based on the non-absolute synchronization reference signal received from the synchronized node 601, the non-synchronized node 603 may acquire whole network synchronization by forwarding the non-absolute synchronization reference signal to the synchronized node 602.

The methods for network synchronization acquisition according to example embodiments of the present invention, which are explained in the following descriptions, are related to detail methods for individual nodes in a wireless network to acquire network synchronization. Also, the present invention focuses upon an OFDMA network environment based on decentralized control. However, the technical spirit of the present invention may not be restricted to the OFDMA based decentralized control network environment, and may also be applied to an OFDM centralized control based network environment, etc.

First, a frame structure for supporting a network synchronization forwarding service will be explained.

Figure 7:
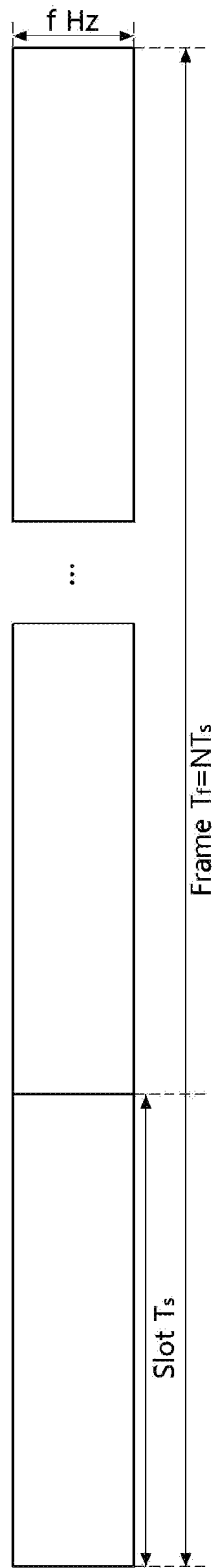
FIG. 7 is a view illustrating a frame structure for providing a network synchronization forwarding service according to an example embodiment of the present invention.

FIG. 7 is a view illustrating a frame structure for providing a network synchronization forwarding service according to an example embodiment of the present invention.

In FIG. 7, for convenience of explanation, a slot and a frame defined in an arbitrary frequency band f Hz are illustrated as an example. In FIG. 7, a horizontal axis represents a time domain, and a vertical axis represents a frequency domain comprising subcarriers. A frame comprises N slots. That is, $T_f = N \cdot T_s$. Here, $T_f$ means a time length of a frame, and $T_s$ means a time length of a slot.

Figure 8:
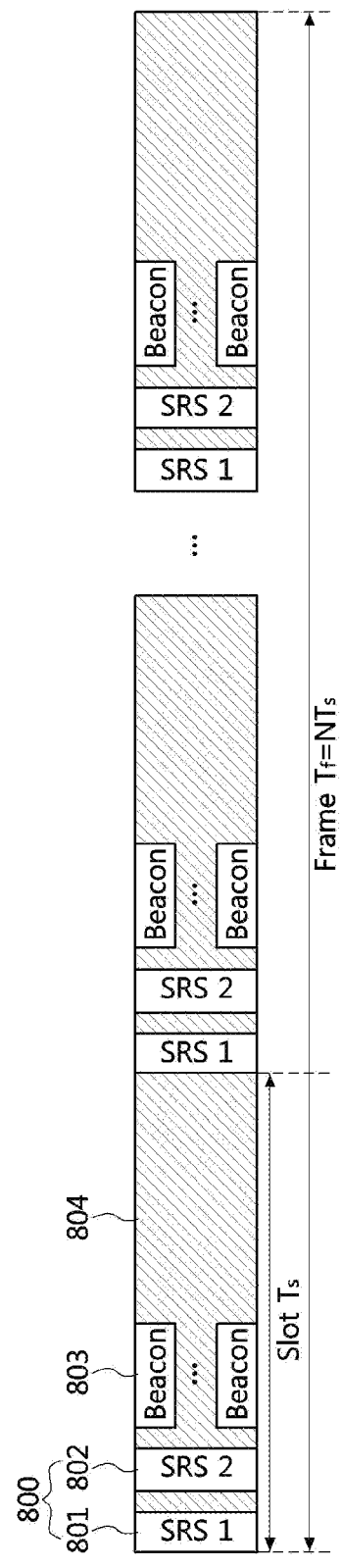
FIG. 8 is a detail view illustrating a frame structure depicted in FIG. 7.

FIG. 8 is a detail view illustrating a frame structure depicted in FIG. 7. FIG. 8 represents channels for forwarding synchronization included in the frame depicted in FIG. 7.

In the present invention, a first synchronization reference signal 801 (hereinafter, referred to as 'SRS1'), a second synchronization reference signal 802 (hereinafter, referred to as 'SRS2'), and a beacon channel 803 are defined. Transmission formats and resources occupied for the SRS1 801, the SRS2 802, and the beacon channel 803 may be defined in advance. Also, the remained resources 804 except the resources occupied by the SRS1 801, the SRS2 802, and the beacon channel 803 may be used to define a data channel and a control channel for information exchange between nodes. The SRS1 801 and the SRS2 802 may also be referred to as a SRS 800.

Each slot constituting a frame may comprise a channel for the SRS1 801, a channel for the SRS2 802, and M channels for the beacon 803. Indexes of the channels for the beacon 803 may be defined as BeaconChIndex ∈ {0, 1, 2, . . . , M−1}.

The SRS1 801 may be configured with a physical waveform which is commonly used by all nodes. The non-synchronized nodes may obtain link-level synchronizations which can decode a start time of a slot or the beacon 803.

The SRS1 801 is a sequence in frequency domain, and not a node-specific signal. Therefore, the waveforms of SRS1 801 which are transmitted by all the nodes are configured identically.

The SRS2 802 is used for measuring a propagation delay. Also, when a plurality of nodes transmit the SRS1 801, a receiving node should separate the plurality of transmitting nodes by using the SRS2 802.

The SRS2 802 may use a Zadoff-Chu (ZC) sequence in frequency domain. The length of the ZC sequence and a root index of the SRS2 may be configured identically. However, cyclic shifts of the SRS2 may be configured differently according to a position of the channel for the beacon 803 and its use.

The beacon 803 is used to transmit node-specific information. A non-synchronized node may request a time adjustment (hereinafter, referred to as 'TA') to a synchronized node by using the beacon. The node to which a TA is requested may measure a propagation delay, and then report information about the measured propagation delay to the node which requested the TA. Here, the information about the measured propagation delay may also be transmitted using the beacon.

A synchronized node may transmit the SRS 800 (SRS1 and SRS2) and the beacon 803 in a specific slot at the same time. Since a frame structure and a slot structure are defined in advance, a non-synchronized node may acquire network synchronization temporarily by using the SRS1 801, and decode the beacon 803. A node which is not a synchronized node may transmit the SRS 800 and the beacon 803 in a specific slot at the same time. In this case, the node may acquire synchronization using the SRS1 801, and then decode the beacon 803. When the absolute reference timing such as a GPS does not exist, a specific node may provide a reference timing for network synchronization by transmitting the SRS 800 and the beacon 803.

Hereinafter, the SRS1 will be explained in further detail.

The SRS1 may be configured with various sequences such as a ZC sequence, a Pseudo Noise (PN) sequence, etc. However, an example using a real PN sequence will be explained.

Figure 9:
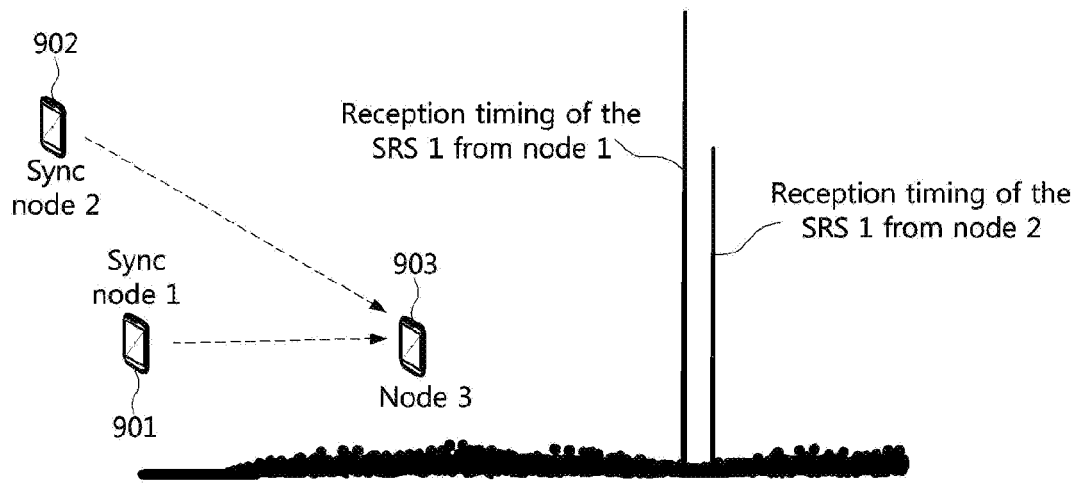
FIG. 9 is a view illustrating SRS1 reception timing observed in a node receiving SRS1.

FIG. 9 is a view illustrating SRS1 reception timing observed in a node receiving SRS1.

Referring to FIG. 9, a synchronized node 901 and a synchronized node 920 transmit SRS1, and a node 903 receives the SRS1s respectively transmitted from each of the nodes 901 and 902. Here, it is assumed that the node 903 receives the SRS1 transmitted from the node 901 first, and then receives the SRS1 transmitted from the node 902. The node 903 may be a non-synchronized node.

When a real sequence is used for the SRS1, since a conjugate symmetry property is represented in a time-domain physical waveform, a SRS1 detector of the node 903 may output a peak in a last reception point of each SRS1 as shown in FIG. 9.

A non-synchronized node may configure its potential transmission timing with a first SRS1 reception timing (that is, a time when a first peak occurs) among a plurality of SRS1 reception timings. For example, when the node 903 determines its transmission timing based on reception timings of SRS1s transmitted from the node 901 and the node 902, if a first SRS1 reception timing is utilized, the node 903 may configure a reception timing of SRS1 transmitted from the node 901 as its potential transmission timing. Here, the potential transmission timing may mean a timing to which propagation delay compensation is not applied yet. The propagation delay may be compensated using SRS2 which will be explained.

Hereinafter, the SRS2 will be explained in further detail.

First, a method for generating SRS2 will be explained in detail.

When M beacon channels are used for a slot, the number of used cyclic shifts may be configured to 2M. A ZC sequence used for SRS2 may be derived as the following methods.

A ZC sequence having a length of $N_{SRS2}$ may be generated as a below equation 1.

$$x_{SRS2}(n) = e^{-j\pi u \frac{n(n+1)}{N_{SRS2}}} \quad \text{[Equation 1]}$$

In the equation 1, $N_{SRS2}$ may mean a length of the ZC sequence and may be a prime number. n may mean an index of element constituting the ZC sequence, and may have a range of $0 \ldots N_{SRS2}-1$. u means an index of a root index of the ZC sequence, and may have a range of $1 \ldots N_{SRS2}-1$.

When a TA is requested through an $m^{th}$ beacon channel ($m \in \{0, 1, 2, \ldots, M-1\}$), the ZC sequence used for SRS2 may be represented as a below equation 2.

$$x'_{SRS2}(n) = x_{SRS2}\left(\left(n + (M+m) \cdot \left\lfloor \frac{N_{SRS2}}{2M} \right\rfloor\right) \bmod N_{SRS2}\right) \quad \text{[Equation 2]}$$

When the $m^{th}$ beacon channel is used for a purpose other than the TA request, the ZC sequence used for SRS2 may be represented as a below equation 3.

$$x'_{SRS2}(n) = x_{SRS2}\left(\left(n + m \cdot \left\lfloor \frac{N_{SRS2}}{2M} \right\rfloor\right) \bmod N_{SRS2}\right) \quad \text{[Equation 3]}$$

Hereinafter, a procedure for forwarding network synchronization and a procedure for TA service will be explained.

A synchronized node may transmit and receive a SRS and a beacon by referring to an absolute time reference.

When a synchronized node does not exist in a wireless network, a non-synchronized node may also transmit a SRS and a beacon. In this case, since a non-synchronized node does not have an absolute time reference, it may transmit a SRS and a beacon by referring to an arbitrary time reference configured by it. Then, the arbitrary time reference may become a time reference for network synchronization.

A non-synchronized node may receive a SRS and a beacon.

A synchronized node is required to transmit a SRS and a beacon with a predetermined period ($T_f$).

A synchronized node selects an arbitrary slot among N slots having a length of $T_f$. Also, a synchronized node arbitrarily selects one of M beacon channels defined in the selected slot.

The synchronized node may transmit a SRS and a beacon in the selected slot by time unit of $T_f$.

If the synchronized node uses $m^{th}$ beacon ($1 \leq m \leq M$), an index of a cyclic shift used for the SRS2 may be m. That is, CyclicShiftIndex=m (no TA request).

If the non-synchronized node detects the SRS1, the non-synchronized node may be transitioned into a synchronized node temporarily (hereinafter, referred to as 'a temporary synchronized node') and may receive a beacon or a SRS transmitted from an adjacent synchronized node.

If the temporary synchronized node identifies an existence of an adjacent synchronized node by receiving the beacon, it may transmit its beacon to the identified adjacent synchronized node. At this time, the temporary synchronized node may request a network synchronization forwarding service and/or a TA service to the adjacent synchronization node through a beacon. In this case, a cyclic shift which is applied to the SRS2 used by the temporary synchronized node may be determined according to the equation 2. In this stage, the temporary synchronized node may transmit a beacon or a SRS with reference to a SRS1 reception timing in which a propagation delay is not compensated.

The adjacent synchronized node, to which the network synchronization forwarding service or the TA service are requested by the temporary synchronized node, may forward a network synchronization signal, or measure a round trip propagation delay ($t_{RTD}$) between it and the non-synchronized node by using the SRS2 transmitted from the non-synchronized node which requested the TA service.

Meanwhile, the adjacent synchronization node which accepts the network synchronization forwarding service request from the non-synchronized node may transmit a SRS and a beacon periodically. Here, the 'periodically' means that it transmits a SRS and a beacon once every $k^{th}$ slot. That is, when the adjacent synchronized node receives the network synchronization forwarding service request from the non-synchronized node, it may transmit a SRS and a beacon with a shorter period than the predetermined period ($T_f$).

Also, the adjacent synchronized node which accepts the TA service request may notify information about the measured propagation delay ($t_{RTD}/2$) to the corresponding node by transmitting a beacon.

The temporary synchronization node which is provided the network synchronization forwarding service changes its state into a synchronized state. Then, the node whose state is changed into a synchronized state compensates its propagation delay so as to transmit a signal or a channel.

When the node which is provided the network synchronization forwarding service does not have data to be transmitted, it may request a stop of the network synchronization forwarding service by transmitting a beacon.

The node which receives the network synchronization forwarding service stop request may stop the network synchronization forwarding service.

For OFDM symbols which are used for a SRS and a beacon in which a propagation delay is not compensated, a long cyclic prefixes (CP) may be used. For other time-frequency resources, a short CP may be used.

Hereinafter, a TA method when SRS1s are received from a plurality of synchronized nodes will be explained.

A node providing a network synchronization forwarding service may measure a propagation delay existing between two nodes by using a SRS2 transmitted from a node which is provided the network synchronization forwarding service.

As shown in FIG. 9, when a node 903 uses a reception timing of a SRS1 transmitted from a synchronized node 901 as its transmission reference, the node 903 is required to request a TA to the synchronized node 901. If the node 903 requests a TA to a synchronized node 902, the node 903 should transmit a SRS2 with a reference of a reception timing of a SRS1 transmitted from the node 902 rather than a reception timing of a SRS1 transmitted from the node 901.

The node 903 should additionally compensate a difference between a propagation delay between the node 903 and the synchronized node 901 and a propagation delay between the node 903 and the synchronized node 902, and then transmit a SRS2 to the synchronized node 901. The node 903 may measure the difference between the above two propagation delays by using SRS2s transmitted respectively by the synchronized nodes 901 and 902.

In the following description, in case that the synchronized node 901 and the synchronized node 902 transmit their SRS and beacon at an identical slot, a method for measuring a difference between two propagation delays will be explained.

Figure 10:
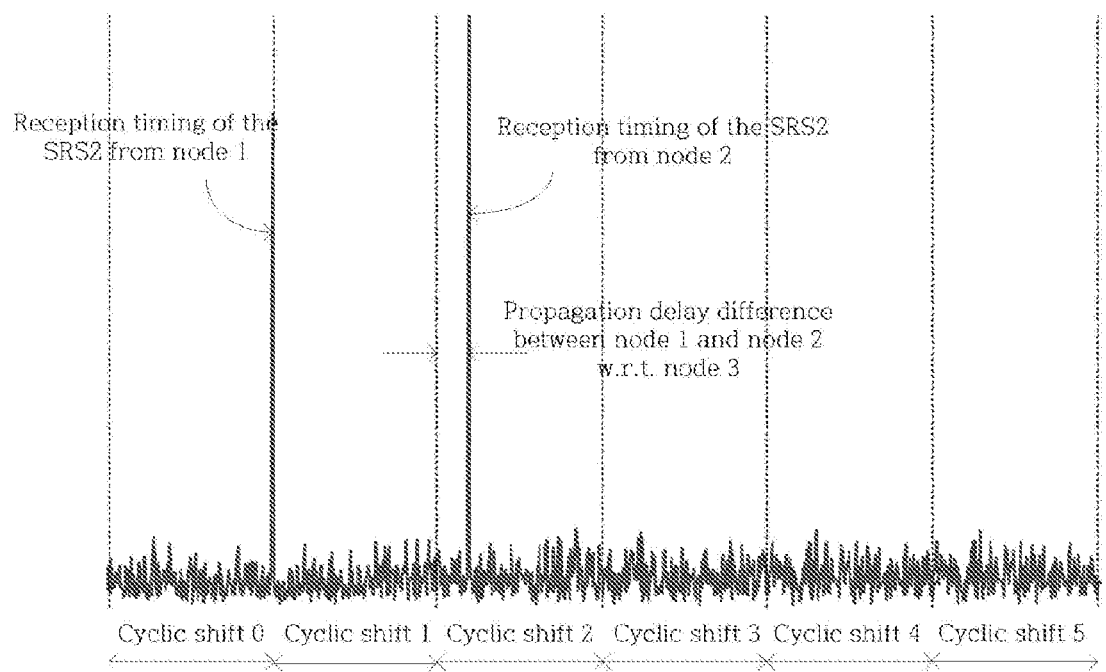
FIG. 10 is a graph to explain a method for separating nodes transmitting SRS1 by using SRS2.

FIG. 10 is a graph to explain a method for separating nodes transmitting SRS1 by using SRS2.

A SRS and a beacon are transmitted simultaneously. Although a physical waveform of a SRS1 is identical without regard to its transmission node, a waveform of a SRS2 may be configured differently according to a position of a beacon channel and contents included in the beacon channel. For explanation, it is assumed that the number of beacon channels for a slot is 3. In this case, a beacon channel index may be represented as beacon channel index $\in \{0, 1, 2\}$, and the number of cyclic shifts which are applied to the SRS2 is 6. That is, Zadoff-Chu cyclic shift index $\in \{0, 1, 2, 3, 4, 5\}$.

When beacon channel indexes selected arbitrarily by the synchronized node 901 and the synchronized node 902 are assumed to be $\{1\}$ and $\{2\}$ respectively, cyclic shift indexes used for SRS2 which they are using may become $\{1\}$ and $\{2\}$ respectively. If reception timing of SRS1 is received by the node 903 is illustrated as shown in FIG. 9, since the node 903 configures a first peak time as its reference timing, the node 903 actually configures a reception timing of SRS1 transmitted from the synchronized node 901 as its reference. FIG. 10 illustrates a reception timing of SRS2 with reference to a reception timing of SRS1 in the node 903.

In FIG. 10, the node 903 can identify whether a SRS1 reception timing configured by it is for the synchronized node 901 or for the synchronized node 902.

Then, when the node 903 requests a TA to the synchronized node 901, the node 903 should transmit a SRS2 with a reference to a current reception timing of SRS1. However, when the node 903 requests a TA to the synchronized node 902, the node 903 should compensate the SRS1 reception timing of the synchronized node 901 by a propagation delay difference of FIG. 10, and then transmit a SRS2 according to the compensated SRS1 reception timing. The propagation delay difference of FIG. 10 means a time difference between a propagation delay between the node 903 and the synchronized node 901 and a propagation delay between the node 903 and the synchronized node 902.

Hereinafter, a method for resolving a problem occurring when a non-synchronized node receives non-absolute synchronization reference signals from a plurality of synchronized nodes will be explained.

A scenario in which a non-synchronized node receives non-absolute synchronization reference signals from a plurality of synchronized nodes may be identical to that of FIG. 6. In FIG. 6, if any one of two nodes (the synchronized nodes 601 and 602) does not use an absolute time reference derived from a GPS, etc. and use a self-configured time reference to transmit SRS, the non-synchronized node 603 may experience a plurality of network synchronizations.

In this case, the non-synchronized node 603 should give up one of network synchronizations according to a predetermined rule. Also, the non-synchronized node 603 is required to forward a network synchronization which is not given up to other node.

Therefore, it is required to set priorities as follows.

When a synchronized node having an absolute time reference and a synchronized node having a non-absolute time reference provide different network synchronizations respectively, a non-synchronized node selects the network synchronization of the synchronized node having an absolute time reference. Here, information for separating a node having an absolute time reference may be checked by using a beacon. The non-synchronized node may request a network synchronization forwarding service or a TA service to the synchronized node having an absolute time reference in order to obtain the network synchronization of the synchronized node having an absolute time difference.

When a plurality of synchronized nodes having non-absolute time reference provide different network synchronizations, each of the plurality of synchronized nodes may be equipped with a counter. Here, the counter may represent the number of nodes which are currently being provided a network synchronization forwarding service from the corresponding synchronized node. When a non-synchronized node selects one of a plurality of network synchronizations transmitted respectively from synchronized nodes, the non-synchronized node may select a network synchronization of a synchronized node having a bigger counter value. The counter value may be transmitted through a beacon. For example, when a synchronized node whose counter value is 3 and a synchronized node whose counter value is 5 exist, a non-synchronized node may acquire a network synchronization provided by the synchronized node having a counter value of 5.

Hereinafter, information elements (hereinafter, referred to as 'IE') of a beacon will be explained.

The beacon IE means information transferred by a beacon. A beacon always includes a node identifier (Node ID) notifying existence of a node to adjacent nodes. Accordingly, a beacon is necessary for link configuration in a decentralized control system. The following information may be transmitted by using a beacon.

A transmission format and a size of beacons may be configured identically. A beacon may perform one of the following functions according to an application indicator included in the beacon IE.

Application Indicator='00': requesting network synchronization forwarding service Application Indicator='01': requesting stop of network synchronization forwarding service Application Indicator='10': notifying a state of network synchronization forwarding service Application Indicator='11': notifying an existence of a node transmitting the beacon (discovery)

Tables 1 and 2 represent beacon IE formats according to the application indicator field in detail.

If a node receiving a beacon identifies an application indicator of the received beacon is '00', the node recognizes the received beacon as a beacon for requesting a network synchronization forwarding service. Also, in case of the beacon for requesting a network synchronization forwarding service, fields such as a 'Synchronization Method', etc. are meaningless so that they may be treated as 'don't care'.

In the tables 1 and 2, a field of the number of neighbor nodes ('# neighbor nodes') represents the number of adjacent nodes in which a node transmitting a beacon is interested. According to implementation, a maximum value for the filed may be configured differently. When the value of the field us 4, four node IDs are listed in a field ('List of neighbor node IDs'). When at least one neighbor node is indicated in a field ('Requesting TA or Network synchronization forwarding service') or a field ('Time adjustment indication'), it is mapped to a node among nodes represented in the field ('List of neighbor node IDs') in one-to-one mapping manner using a bitmap. For example, when a bitmap comprising 4 bits is used, a first bit of the bitmap corresponds to a first node (a node having ID1), and a third bit of the bitmap corresponds to a third node (a node having ID3 ).

TABLE 1

| | | |
|---|---|---|
| Use of Beacon | requesting network synchronization forwarding service | notifying a state of network synchronization forwarding service |
| Note ID | Identifier of a node transmitting this beacon | Identifier of a node transmitting this beacon |
| Infra Connection Indication | 0: no infra connection<br>1: infra connection reference | 0: no infra connection<br>1: infra connection reference |
| Power Supply Type | 0: battery<br>1: power plant/motor generator | 0: battery<br>1: power plant/motor generator |
| Synchronization Method | Don't care | 00: connected to GPS<br>01: connected to eNB<br>10: non-absolute time reference<br>11: invalid |
| Counter | Don't care | The number of nodes currently being provided network synchronization forwarding service |
| # Neighbor Nodes | 000: 0<br>001: 1<br>010: 2<br>011: 3<br>. . . | 000: 0<br>001: 1<br>010: 2<br>011: 3<br>. . . |
| List of neighbor Node IDs | For example, when # neighbor nodes = 100, Node ID1, Node ID2, Node ID3 . . . | For example, when # neighbor nodes = 100, Node ID1, Node ID2, Node ID3 . . . |
| Requesting TA or Network synchronization forwarding service | For example,<br>1000: requesting to Node ID1<br>0100: requesting to Node ID2<br>0010: requesting to Node ID3<br>0001: requesting to Node ID4 | For example,<br>1000: a state in which network synchronization forwarding service is being provided according to a request of Node ID1<br>0110: a state in which network synchronization forwarding service is being provided according to requests of Node ID2/ID3<br>. . . |
| Expected Service Time | Expected time of be provided network synchronization forwarding service | Network synchronization forwarding service time to be provided.<br>(when the time elapses, the service is to be stopped) |
| Time Adjustment Indication | Don't care | For example,<br>1000 + TA: reporting PD to Node ID1<br>0100 + TA: reporting PD to Node ID2<br>0010 + TA: reporting PD to Node ID3<br>0001 + TA: reporting PD to Node ID4<br>. . .<br>(PD is a propagation delay measured based on SRS2 by a node to which TA service is requested.) |
| SRS period | Don't care | SRS transmission period<br>(If this value is N, the node transmits SRS every $N^{th}$ slot. Also, the node transmits SRS in a current slot.) |

TABLE 2

| | | |
|---|---|---|
| Use of Beacon | requesting stop of network synchronization forwarding service | Discovery |
| Note ID | Identifier of a node transmitting this beacon | Identifier of a node transmitting this beacon |
| Infra Connection Indication | 0: no infra connection<br>1: infra connection reference | 0: no infra connection<br>1: infra connection reference |

TABLE 2-continued

| | | |
|---|---|---|
| Power Supply Type | 0: battery<br>1: power plant/motor generator | 0: battery<br>1: power plant/motor generator |
| Synchronization Method | Don't care | 00: connected to GPS<br>01: connected to eNB<br>10: non-absolute time reference<br>11: invalid |
| Counter | Don't care | The number of nodes currently being provided network synchronization forwarding service |
| # Neighbor Nodes | 000: 0<br>001: 1<br>010: 2<br>011: 3<br>. . . | 000: 0<br>001: 1<br>010: 2<br>011: 3<br>. . . |
| List of neighbor Node IDs | For example, when # neighbor nodes = 100, Node ID1, Node ID2, Node ID3 . . . | For example, when # neighbor nodes = 100, Node ID1, Node ID2, Node ID3 . . . |
| Requesting TA or Network synchronization forwarding service | For example,<br>1000: requesting stop of service to Node ID1<br>0100: requesting stop of service to Node ID2<br>0010: requesting stop of service to Node ID3<br>0001: requesting stop of service to Node ID4 | Don't care |
| Expected Service Time | Don't care | Don't care |
| Time Adjustment Indication | Don't care | For example,<br>1000 + TA: reporting PD to Node ID1<br>0100 + TA: reporting PD to Node ID2<br>0010 + TA: reporting PD to Node ID3<br>0001 + TA: reporting PD to Node ID4<br>. . .<br>(PD is a propagation delay measured based on SRS2 by a node to which TA service is requested.) |
| SRS period | Don't care | SRS transmission period (If this value is N, the node transmits SRS every $N^{th}$ slot. Also, the node transmits SRS in a current slot.) |

Hereinafter, examples to which a method for acquiring network synchronization according to the present invention is applied will be explained.

A node which transmits synchronization signals periodically for other nodes to acquire network synchronization may be referred to as a 'synchronization header' (SH). All nodes may become a synchronization header. In the following descriptions, a method for network synchronization acquisition by using a synchronization header utilizing the above-described method for network synchronization acquisition will be explained. In the following descriptions, a user equipment (UE) and a node have an identical meaning.

Resource Allocation

Figure 11:
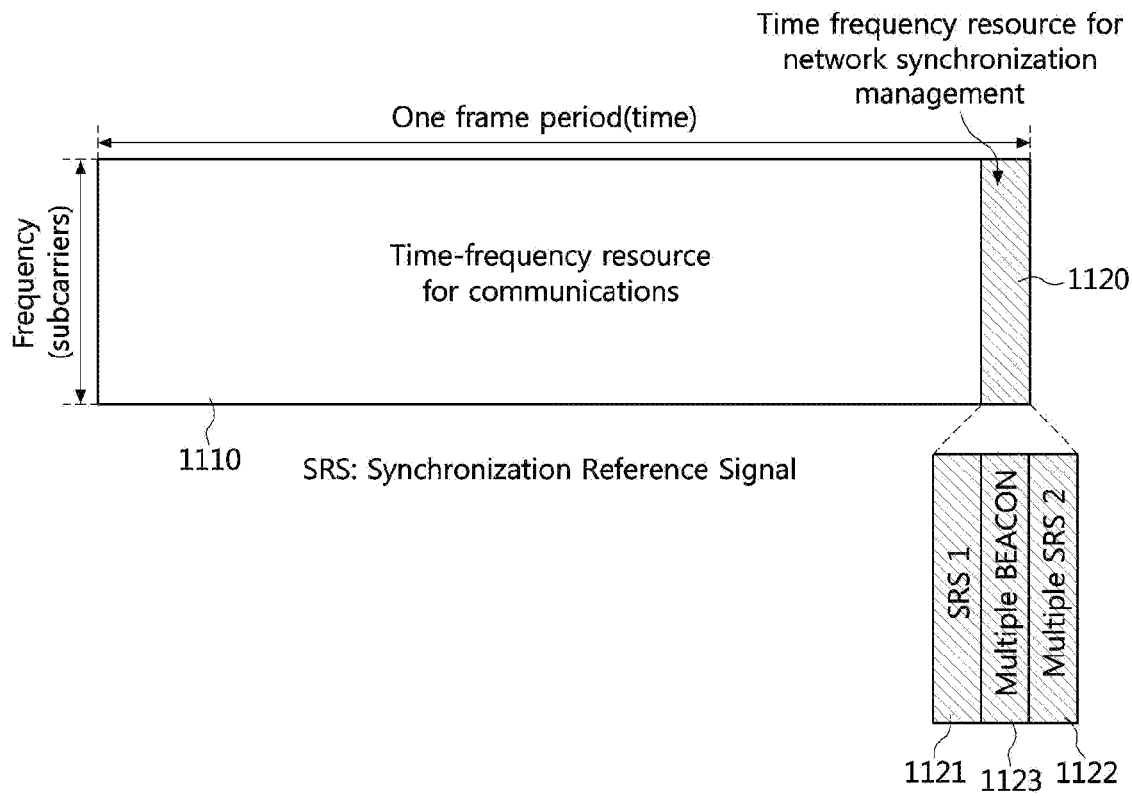
FIG. 11 is a conceptual diagram explaining a method for allocating resources for network synchronization management.

FIG. 11 is a conceptual diagram explaining a method for allocating resources for network synchronization management.

As shown in FIG. 11, time-frequency resources in a predefined frame may be classified into resources 1110 for communications and resources 1120 for synchronization management.

Signals and Channels for Network Synchronization

In FIG. 11, the resources 1120 allocated for synchronization management may be used for transmitting a SRS1 1121, a SRS2 1122, and a beacon 1123. A below table 3 represents purposes and waveforms of signals and channels for synchronization management, and summarizes uses of the SRS1 1121, the SRS2 1122, and the beacon 1123.

TABLE 3

| Signal/Channel | Purpose | Waveform |
|---|---|---|
| SRS1 | AGC, frame timing acquisition, AFC | WLAN PR-like (non UE-specific, common waveform) |
| SRS2 | TA | LTE PRACH-like (Cyclic-shifted Zadoff-Chu) |
| Beacon | Synchronization Management | Data Packet |

The SRS1 1121 may be used for an automatic gain control (AGC), a frame timing acquisition, and an automatic frequency control (AFC). The SRS1 1121 may have a waveform similar to that of a wireless LAN, and may be configured with a waveform common to all terminals not a waveform specific to a terminal (or, a node).

The SRS2 1122 may be used for a TA, and configured with a ZC sequence which is cyclic-shifted similarly to a Physical Random Access Channel (PRACH) of an Long Term Evolution (LTE) system.

The beacon 1123 may be used for synchronization management, and configured as a data packet.

A Network Synchronization Procedure

The network synchronization procedure may be started at an initial state in which network synchronization is not established.

All terminals (for example, including a terminal 1) may transmit a SRS1 and a beacon at any time by ignoring frame timing. Also, all terminals except the terminal 1 can decode the beacon transmitted by the terminal 1. The reason how all the terminals can decode the beacon transmitted by the terminal 1 is that the terminal 1 transmits the SRS1 together with the beacon, and all other terminals can acquire synchronization for receiving the beacon by performing an AGC and an AFC by using the SRS1 received from the terminal.

For network synchronization acquisition, at least one terminal is required to transmit SRS1 s and beacons periodically. As described above, a terminal transmitting SRS1 and beacon periodically may be defined as a synchronization header (SH). In order to reduce power consumption of a terminal and resolve a problem of duplexing, a synchronization header does not transmit SRS1 and beacon for every frames. It is assumed that a synchronization header transmits SRS1 and beacon once for every N frames (here, N is a natural number equal to or more than 2).

Figure 12:
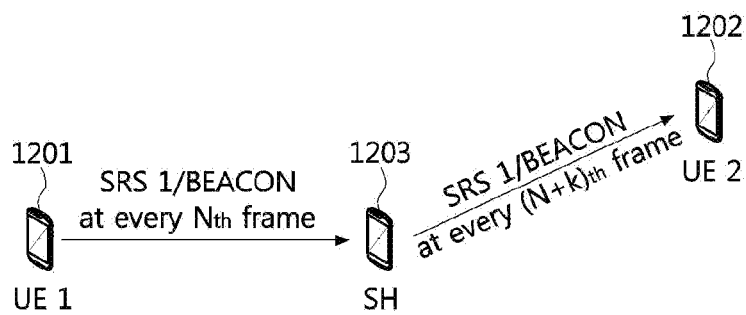
FIG. 12 is a view illustrating a method for network synchronization forwarding to resolve a problem of duplexing.

FIG. 12 is a view illustrating a method for network synchronization forwarding to resolve a problem of duplexing.

As shown in FIG. 12, a case, in which a synchronization header 1203 which acquired network synchronization by using a SRS1 and a beacon transmitted from a terminal 1201 forwards them (that is, a SRS1 and a beacon) to a terminal 1202, may occur. In this case, the synchronization header 1203 should acquire network synchronization by using a SRS1 and a beacon transmitted from the terminal 1201. That is, if the synchronization header 1203 transmits SRS1 and beacon for every frames, the synchronization header 1203 cannot receive SRS1 and beacon from the terminal 1201. Therefore, if the terminal 1201 is configured to transmit SRS1 and beacon in every $N^{th}$ frame and the synchronization header is configured to transmit SRS1 and beacon in every $(N+k)^{th}$ frame, the above-described problem may be resolved.

A Network Synchronization Acquisition Procedure

A terminal may determine whether network synchronization is acquired or not by monitoring whether SRS1 and beacon are transmitted periodically or not. The information transmitted through a beacon may include information about a transmission period of SRS1, a power status, network connectivity, a request of changing a role of synchronization header, etc.

Any of all terminals may become a synchronization header based on determination by itself or a request of other terminal. Also, all the terminals may request a periodical transmission of SRS1 and beacon to an adjacent terminal by using a beacon.

All synchronization headers (or, all terminals) may request a TA to a currently serving synchronization header transmitting SRS1s and beacons periodically by transmitting a beacon and a SRS2.

The serving synchronization header which receives the TA request may measure a propagation delay by using the SRS2.

The serving synchronization header may report the measured propagation delay information to the corresponding terminal (or, the corresponding synchronization header) by using a SRS1 and a beacon.

The corresponding synchronization header (or, the corresponding terminal) may modify its transmission timing based on the received propagation delay information.

Since the above-described beacon hand shaking is a contention based procedure and so a possibility of collision exists, a method for resolving it is necessary.

Figure 13:
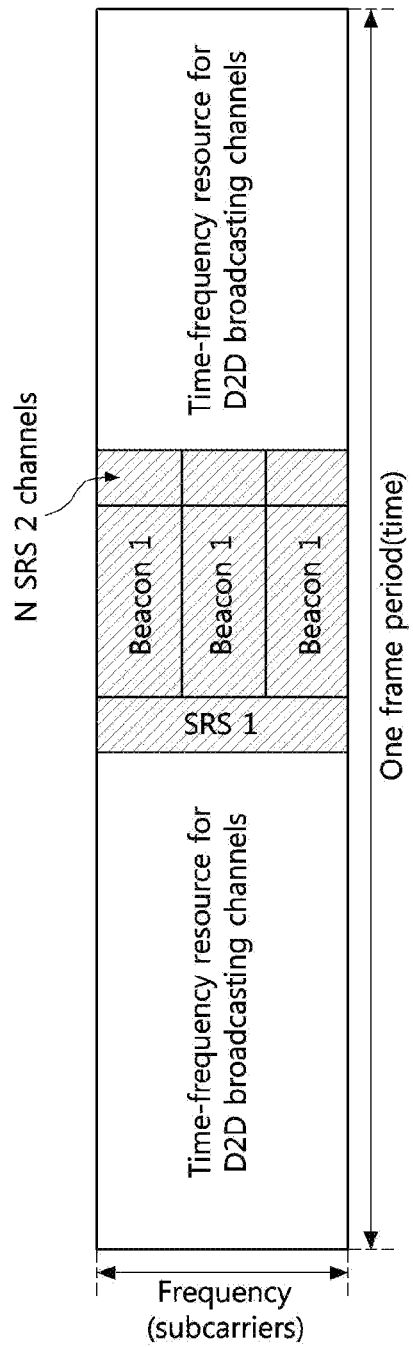
FIG. 13 is a method for multiplexing beacons and SRS2s for enhancing a problem of performance decrease due to collisions.

FIG. 13 is a method for multiplexing beacons and SRS2s for enhancing a problem of performance decrease due to collisions.

As shown in FIG. 13, a plurality of beacons and SRS2s can be multiplexed so as to enhance performance decrease due to collisions. That is, beacons and SRS2s may be mapped in one-to-one manner as shown in FIG. 13. Here, a Code Division Multiplexing to (CDM) manner, in which a same ZC sequence whose cyclic shifts are applied differently to a same time-frequency resource is used, may also be applied.

Network Synchronization Between Multiple Synchronization Headers

Figure 14:
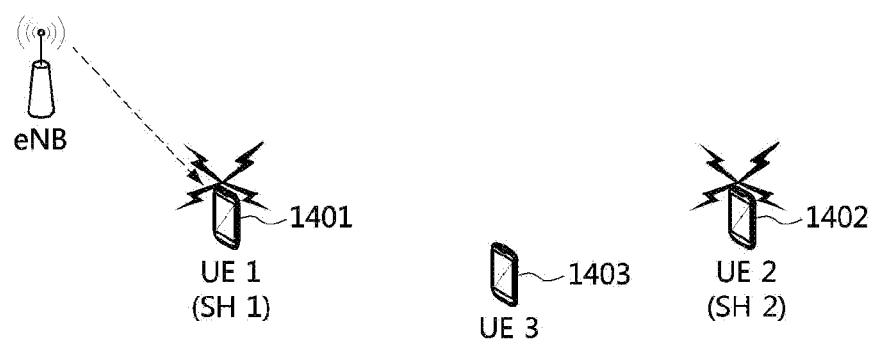
FIG. 14 is a conceptual diagram explaining a method for acquiring network synchronization when a plurality of synchronization headers exist.

FIG. 14 is a conceptual diagram explaining a method for acquiring network synchronization when a plurality of synchronization headers exist.

In FIG. 14, a terminal 1403 may receive SRS1s and beacons from two synchronization headers transmitting SRS1s and beacons periodically with different time references. In this case, in order to establish network synchronization, the terminal 1403 selects one among SRS1 s transmitted from the two synchronization headers and then forwards an obtained time reference to another synchronization header. For this, several rules are required to be determined. As an example, a synchronization header having network connectivity or a synchronization header having high power capability may have high priority.

When a plurality of synchronization headers exist as shown in FIG. 14, network synchronization may be established through the below procedure. Here, a first synchronization header 1401 is assumed to have a priority according to its network connectivity.

The terminal 1403 transmits a beacon to a second synchronization header 1402. In this case, the beacon is transmitted according to a timing of the second synchronization header 1402. Also, the beacon may include a request of stopping periodical SRS1 and beacon transmission.

The terminal 1403 may become a synchronization header by using periodic SRS1s and beacons transmitted from the first synchronization header 1401. That is, the terminal 1403 also can transmit periodic SRS1 and beacon.

The terminal 1402 (the previous second synchronization header) acquires network synchronization by using SRS1 and beacon transmitted from the terminal 1403.

According to the above-described method for acquiring network synchronization in a wireless network, a detail method for acquiring network synchronization in a decentralized control based wireless network is provided. Therefore, an OFDMA may be introduced in the decentralized control based wireless network, and communication distances may be extended. Also, a power consumption of a node may be reduced, and a performance (throughput) of a node may be enhanced. Also, efficiency of radio resources may be enhanced.

While the example embodiments of the present invention and their advantages have been described in detail, it should be understood that various changes, substitutions and alterations may be made herein without departing from the scope of the invention.

What is claimed is:

1. A method for network synchronization acquisition, performed in a first terminal, the method comprising:
acquiring synchronization based on an infra base station synchronization signal transmitted from an infra base station;
generating a first synchronization signal and a beacon channel including network connectivity information of the first terminal based on the infra base station synchronization signal; and
transmitting the first synchronization signal and the beacon channel according to a predetermined period,
wherein the beacon channel further includes at least one of a request of a network synchronization forwarding service or time adjustment (TA), a request for stopping the network synchronization forwarding service, a notification of a state of the network synchronization forwarding service, and information used for the first terminal to advertise itself.

2. The method according to claim 1, wherein the network connectivity information indicates that the first terminal has network connectivity to the infra base station.

3. The method according to claim 1, wherein the first synchronization signal is a Zadoff-Chu sequence in frequency domain.

4. The method according to claim 1, wherein the first synchronization signal is used to decode the beacon channel.

5. The method according to claim 1, wherein the first synchronization signal and the beacon channel are transmitted in a slot at a same time.

6. A method of wireless network synchronization, performed in a second terminal for direct communications by a first terminal, the second terminal, and a third terminal, the method comprising:
receiving a first synchronization signal and a first beacon channel from the first terminal according to a first period, the first beacon channel including network connectivity information of the first terminal;
receiving a second synchronization signal and a second beacon channel from the third terminal, the second beacon channel including network connectivity information of the third terminal;
setting synchronization of the second terminal by using the first synchronization signal and the first beacon channel in case the network connectivity information included in the first beacon channel indicates that the first terminal has network connectivity and the network connectivity information included in the second beacon channel indicates that the third terminal has no network connectivity;
generating a third synchronization signal corresponding to the first synchronization signal and a third beacon channel corresponding to the first beacon channel; and
transmitting the third synchronization signal and the third beacon channel to a fourth terminal according to a second period having a same periodicity as the first period and having a time delay corresponding to a predetermined time offset from the first period.

7. The method according to claim 6, wherein the network connectivity information indicates a priority for synchronization acquisition.

8. The method according to claim 6, wherein the second terminal has no network connectivity.

9. A method of wireless network synchronization, performed in a second terminal for direct communications by a first terminal and the second terminal, the method comprising:
receiving a first synchronization signal and a first beacon channel from the first terminal according to a first period;
generating a second synchronization signal corresponding to the first synchronization signal and a second beacon channel corresponding to the first beacon channel; and
transmitting the second synchronization signal and the second beacon channel according to a second period having a same periodicity as the first period and having a time delay corresponding to a predetermined time offset from the first period,
wherein the first beacon channel includes network connectivity information of the first terminal, and the second beacon channel includes network connectivity information of the second terminal.

10. The method according to claim 9, wherein the network connectivity information of the first terminal indicates whether the first terminal has network connectivity to an infra base station, and the network connectivity information of the second terminal indicates that the second terminal does not have network connectivity to an infra base station.

11. The method according to claim 9, wherein each of the first beacon channel and the second beacon channel further includes at least one of a request of a network synchronization forwarding service or time adjustment (TA), a request for stopping the network synchronization forwarding service, a notification of a state of the network synchronization forwarding service, and information used for a terminal transmitting each of the first beacon channel and the second beacon channel to advertise itself.

12. The method according to claim 9, wherein the first synchronization signal is used to decode the first beacon channel, and the second synchronization signal is used to decode the second beacon channel.

13. The method according to claim 9, wherein each of the first synchronization signal and the second synchronization signal is a Zadoff-Chu sequence in frequency domain.

14. A method of wireless network synchronization, performed in a third terminal for direct communications by a first terminal, a second terminal, and the third terminal, the method comprising:
receiving a first synchronization signal and a first beacon channel from the first terminal according to a first period;
receiving a second synchronization signal and a second beacon channel from the second terminal according to a second period;
acquiring synchronization based on the first synchronization signal or the second synchronization signal selectively by using network connectivity information included in the first beacon channel and network connectivity information included in the second beacon channel;
wherein, in response to acquiring synchronization based on the first synchronization signal, transmitting a third synchronization signal corresponding to the first synchronization signal and a third beacon channel corresponding to the first beacon channel according to a third period having a same periodicity as the first period and having a time delay corresponding to a predetermined time offset from the first period; and
wherein, in response to acquiring synchronization based on the second synchronization signal, transmitting a fourth synchronization signal corresponding to the second synchronization signal and a fourth beacon channel corresponding to the second beacon channel according to a fourth period having a same periodicity as the second period and having a time delay corresponding to a predetermined time offset from the second period.

15. The method according to claim 14, wherein the network connectivity information included in the first beacon channel indicates whether the first terminal has network connectivity to an infra base station, and the network connectivity information included in the second beacon channel indicates whether the second terminal has network connectivity to an infra base station.

16. The method according to claim 14, wherein, in the acquiring synchronization, the synchronization is acquired based on the first synchronization signal when the network connectivity information included in the first beacon channel indicates that the first terminal has network connectivity to an infra base station, and the synchronization is acquired based on the second synchronization signal when the network connectivity information included in the second beacon channel indicates that the second terminal has network connectivity to an infra base station.

17. The method according to claim 14, wherein each of the first to fourth beacon channels further includes at least one of a request of a network synchronization forwarding service or time adjustment (TA), a request for stopping the network synchronization forwarding service, a notification of a state of the network synchronization forwarding service, and information used for a terminal transmitting each of the first to fourth beacon channels to advertise itself.

\* \* \* \* \*